United States Patent
Soini (10) Patent No.: US 9,538,366 B2
(45) Date of Patent: Jan. 3, 2017

(54) SYSTEMS AND METHODS OF REMOTELY CONTROLLING MOBILE DEVICE SETTINGS AND FUNCTIONALITY

(71) Applicant: T-Mobile USA, Inc., Bellevue, WA (US)

(72) Inventor: Jonathan Soini, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/565,161

(22) Filed: Dec. 9, 2014

(65) Prior Publication Data

US 2016/0044497 A1 Feb. 11, 2016

Related U.S. Application Data (60) Provisional application No. 62/033,954, filed on Aug. 6, 2014.

(51) Int. Cl.
| | |
|---|---|
| *H04M 3/00* | (2006.01) |
| *H04W 8/22* | (2009.01) |
| *H04W 24/02* | (2009.01) |
| *H04W 24/04* | (2009.01) |
| *H04W 88/02* | (2009.01) |

(52) U.S. Cl.
CPC ............ *H04W 8/22* (2013.01); *H04W 24/02* (2013.01); *H04W 24/04* (2013.01); *H04W 88/02* (2013.01)

(58) Field of Classification Search
CPC .. G06F 3/04842; G06F 21/31; G06F 17/2785; G06F 17/30386; G06F 11/3409; G06F 11/3466; G06F 11/3476; G06F 11/362; G06F 11/3672; G06F 11/368; G06F 21/575; G06F 21/60; G06F 8/61; H04W 12/06

USPC .............................. 455/418, 419, 423
See application file for complete search history.

(56) References Cited

U.S. PATENT DOCUMENTS

| | | | |
|---|---|---|---|
| 8,181,066 B2 | 5/2012 | Pelley et al. | |
| 8,655,336 B1 * | 2/2014 | Dempski | H04L 41/5074 370/310.2 |
| 2005/0149564 A1 * | 7/2005 | Jain | H04L 67/26 |
| 2007/0243865 A1 | 10/2007 | Cho | |

(Continued)

FOREIGN PATENT DOCUMENTS

JP          2012230451         11/2012

OTHER PUBLICATIONS

PCT Search Report and Written Opinion mailed Dec. 11, 2015 for PCT application No. PCT/US2015/043427, 11 pages.

*Primary Examiner* — Kwasi Karikari
(74) *Attorney, Agent, or Firm* — Lee & Hayes, PLLC (57) ABSTRACT

Systems and methods for a customer care system. An example diagnostics back-end system may be associated with a telecommunications provider. The diagnostics back-end system may perform diagnostic analyzes of information and settings associated with a mobile device, identify resolvable issues based on the diagnostic analyzes, determine execution eligibility of each of one or more solution actions associated with each resolvable issue and upon determination that execution of the one or more solution actions are eligible, cause display of a single graphical user interface button at a user interface device of a customer care agent terminal, wherein activation of the single graphical user interface button causes execution of associated solution actions performed on the mobile device.

14 Claims, 9 Drawing Sheets

(56) References Cited

U.S. PATENT DOCUMENTS

2009/0082008 A1* 3/2009 Thorell ................ G06F 11/362
                                                        455/423

* cited by examiner

SYSTEMS AND METHODS OF REMOTELY CONTROLLING MOBILE DEVICE SETTINGS AND FUNCTIONALITY

CROSS REFERENCE TO RELATED APPLICATIONS

This patent application claims priority to U.S. provisional patent application Ser. No. 62/033,954, filed Aug. 6, 2014. Application Ser. No. 62/033,954 is fully incorporated herein by reference.

BACKGROUND

Each year, thousands of cell phones are taken to stores and repair centers. Many of these phones aren't really broken, or could be easily fixed, but are instead returned, and stores are stuck with a plethora of "broken" cell phones. Current solutions include remotely performing diagnostics and repairs of computers and mobile devices. Generally, these solutions guide a customer-care associate through the process of diagnosing the issue, fixing it on the spot, or processing a repair ticket. That keeps the customer happy, because in more situations than not, the customer walks out with his phone, data intact, or knowing that his phone is truly broken and will be fixed.

In the support process, the customer-care associate may educate the customer, thus decreasing the likelihood that the customer returns with the same problem.

A first way that cell phone support software works is by a self-service application (app) installed on the phone at the point of sale. The app allows the customer to troubleshoot the problem himself and learn the best uses of his phone, which will save embarrassing "user error" store visits. This way is prone to users' inappropriately applying suggested solutions.

A second way is called over-the-air (OTA). The smart phone can be diagnosed using a call-center system. A call-center representative can view the system-generated diagnostics. However, the call-center representative must go step by step through a resolution process with the customer. This is a time-consuming process with no guarantees that the customer will remember the process of fixing, for future reference, or that the customer's device can be repaired as the customer-care representative promises, due to specialized current device settings or other installed apps that may cause other problems if the repair is attempted.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 9-1 shows a user's mobile device presenting an exemplary screenshot for providing information related to a solution to be performed on the user's mobile device;

FIG. 9-2 shows a user's mobile device presenting an exemplary screenshot for allowing a user to enter a PIN for accepting actions to be performed at the user's mobile device;

FIG. 9-3 shows a user's mobile device presenting an exemplary screenshot for allowing a user to agree to have an action performed on the user's mobile device by entering a predefined word or phrase;

DETAILED DESCRIPTION

In various implementations, the technology facilitates interactions between the user of a mobile telecommunications or tablet device and a call center, in order to help the user reduce interaction with a customer-care system or to streamline or eliminate some of the oral interactions during a voice call with a human agent that are necessary to resolve the user's problem or request.

A system, described in detail below, facilitates interactions with computer telephony integration (CTI) equipment. A software component can permit connectivity to server-based components that, in turn, interface with a gateway server or CTI resources. For example, the system provides information appearing on the display of a call-center agent's terminal, such as the context of a caller who is routed to the agent. The agent may see if the user was, prior to initiating a call, using a menu of the help application to obtain technical support information. In another example, the agent sees that a user has already provided account login or authentication information into a graphical user interface of the user's mobile telecommunications device. Accordingly, the call-center agent may not need to orally ask for authentication information during a phone call with the user, thereby saving time of the agent and the user.

The system may automatically display information relating to a caller on an agent's computer screen, such as information relating to the caller's account, the caller's mobile device, the caller's billing information, the history of recent interactions with the caller, other customer-relationship management (CRM) information for the caller, the likely reasons why the caller may be calling (or suggested answers to likely questions), diagnostic information about the caller's mobile device, diagnostic information about coverage-related issues associated with the caller's mobile device, diagnostic information about settings associated with the caller's mobile device, and so on.

The diagnostic information may also store or receive information that a caller or potential caller's mobile device has recently experienced an unexpected malfunction. The diagnostic information may subsequently be displayed on a call-center agent's computer monitor. The call-center agent's computer monitor will present a single-issue solutions button that, when activated, will resolve a discovered diagnostic issue. The single-issue solution button is presented, provided that an eligibility check has successfully been completed relative to the associated issue.

Various examples of the invention will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Exemplary System

Figure 1:
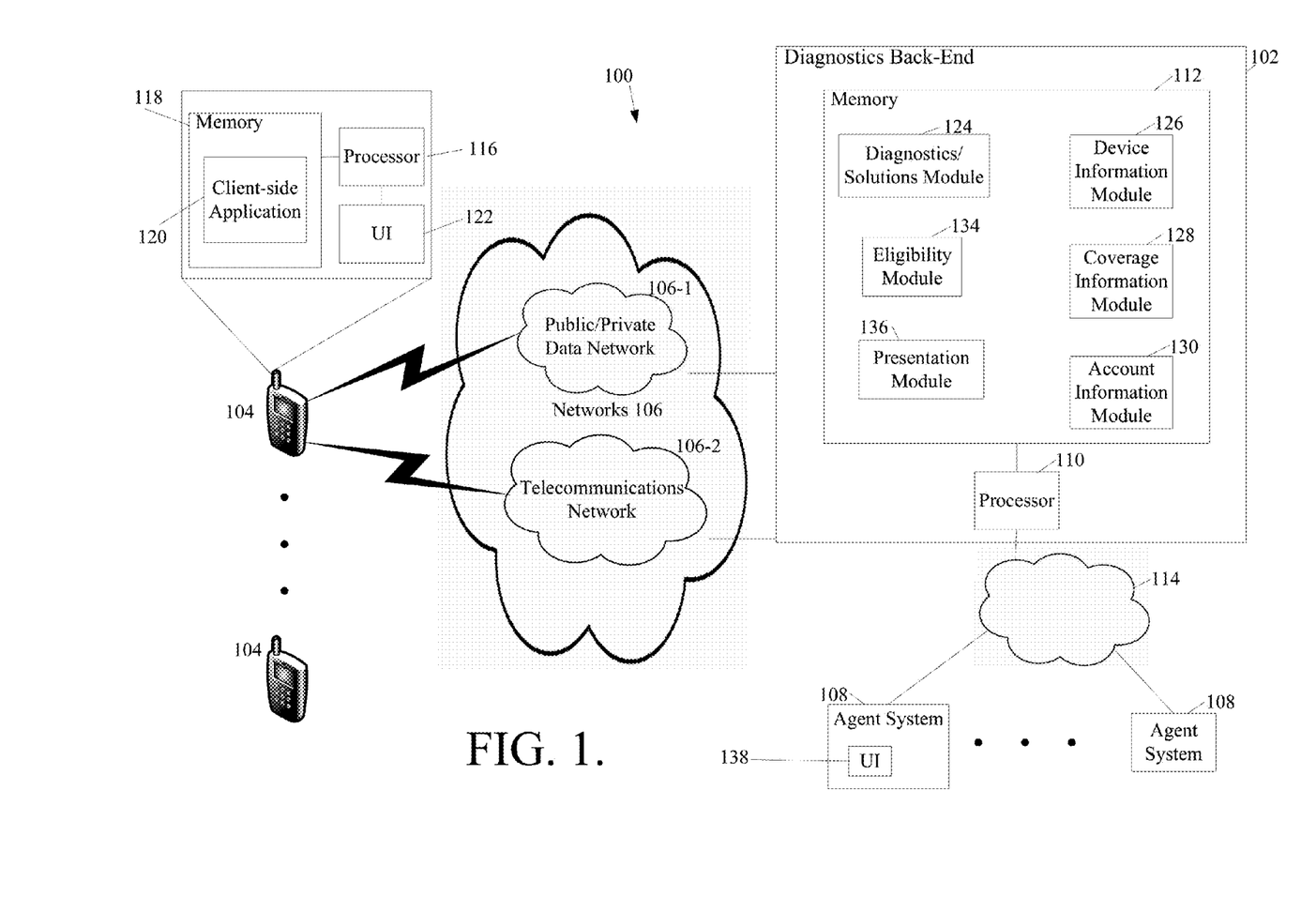
FIG. 1 illustrates a block diagram of an exemplary system formed in accordance with an implementation of the present invention.

FIG. 1 is a system diagram of an exemplary computer-telephony support system 100 for providing assistance to a user of a mobile device. The computer-telephony support system 100 includes a diagnostics back-end system 102 that is communicatively coupled to telecommunication devices (mobile devices) 104 used by end users via one or more networks 106. Exemplary networks 106 include a public/private network(s) 106-1 and a telecommunications network(s) 106-2. Some telecommunication devices are mobile telecommunication devices, e.g., a smart phone, tablet, smart watch, a cell phone, and/or a wired or cordless phone. The diagnostics back-end system 102 communicates with agent terminals 108 (operated by human agents) located at one or more call centers or at a retail facility, one or more processors 110 and one or more memory devices 112, all of which are communicatively coupled over one or more networks 114.

The diagnostics back-end system 102 could support multiple call centers and retail stores for allowing them to view diagnostics information. Even end-users may be able to fix their own phones from a desktop PC in the future with support from the diagnostics back-end system 102. The diagnostics back-end system 102 determines solutions to malfunctions or issues related to a particular mobile device 104 in order to improve the user's experience of the mobile device. The diagnostics back-end system 102 determines whether the user's mobile device and/or the user's account settings indicate that the user's mobile device is eligible for application of any determined solution. If the diagnostics back-end system 102 determines that the user's mobile device is eligible, then a single solution button, menu item, or link is presented on a graphical user interface (GUI) at the agent's terminal 108. Activation of the single solution button, menu or link by the agent causes communication with a client-side app located at the user's mobile device 104. The client-side app applies the solution to the identified issues, based on information included within the communication and solution action information already stored at the mobile device 104 and based on various levels of user authorization, if applicable.

The mobile device 104 includes processing device(s) 116, memory 118 for storing a client-side app 120, and one or more user interface devices 122 (e.g., keyboard, touchscreen display, mouse, etc.). The client-side app 120 is executable by the processing device 116. The user interface 122 includes a graphical user interface. Other mobile devices may have user interfaces different from the user interface 122.

The networks 106 may include any of wireless telecommunication networks: e.g., a cellular network such as a global system for mobile communications network (GSM), a code division multiple access (CDMA) network, a 3G/4G network, an IEEE 802.11 or 802.16 family network (such as a WiFi or WiMAX network), a satellite communications network, and so on. The networks 106 support the transmission of data. For example, the networks 106 may support the transmission of data over a wired and/or wireless telecommunication network via any one or a combination of the following techniques: short messaging service ("SMS") including binary SMS; general packet radio service (GPRS), 3GPP long-term evolution (LTE), Internet protocol (IP), hypertext transport protocols (HTTPS), session-initiated protocol (SIP), and any other techniques known in the art for delivering data across wired or wireless networks.

The memory 112 of the diagnostics back-end system 102 includes a plurality of processor-executable modules. The processor-executable modules may include a diagnostics/solutions module 124, a device information module 126, a coverage information module 128, an account information module 130, an eligibility module 134, and a presentation module 136.

Upon a service session initiation between an agent at the agent terminal 108 and a user at the mobile device 104, the diagnostics/solutions module 124 determines any issues that are present, based on information received from any of the device information module 126, the coverage information module 128, and/or the account information module 130. The determination of issues may not be dependent upon service session initiation, but may occur at any time. The diagnostics/solutions module 124 determines whether solutions exist for resolving any of the identified diagnostic issues. The eligibility module 134 determines if the user's mobile device 104 is eligible for application of a determined solution (i.e., execution eligibility for the solution), based on information provided by the modules 126-130. In response to a determination of the existence of an eligible solution, the presentation module 136 presents a single resolution button at a user interface device 138 at the agent terminal 108.

Agent activation of the single resolution button, menu or link causes the processor 110 to transmit a solution message generated by the diagnostic/solutions module 124 to the mobile device 104 via the network(s) 106. Upon reception of the solution message, the processor 116 validates the received message, then performs one or more action steps that are based on a solution-identifier portion of the message in accordance with any applicable parameters included within the message.

In some examples, the solution message is at most 160 characters in length. This is to accommodate various network transmission protocols, such as the short message service (SMS) protocol.

The following is an exemplary solutions message:
[code]: [solution identifier]: [parameter(s)]

The client-side app 120 identifies resolution actions that are to be performed based on the solution identifier. The client-side app 120 uses any included parameters when performing the identified actions.

The resolution actions may require the user to perform one of a number of authorizations, due to a previously determined severity level associated with actions that are to be performed on the mobile device.

After execution of the resolution actions, the mobile device 104 sends a communication to the agent via the user interface 138 of the agent terminal 108, informing the agent that the solution has been applied. The mobile device 104 may also inform the agent when the solution has failed to complete or has not been initiated, either because the user failed to authorize initiation or for some other reason.

In various implementations, the processor 110 may be implemented by a single processor on a single computing device, by multiple processors on a single computing device, or by multiple processors on multiple computing devices.

The memory devices 112 or 118 may be any one or a combination of storage devices (e.g., RAM, flash memory, or other memory devices). The memory devices 112 or 118 may contain data and computer-executable instructions, which may be executed by the associated processor 110 or 116. The data and computer-executable instructions may implement operating systems and application programming interfaces (APIs) for interfacing with the operating systems, or other libraries, such as may be provided or compiled by software development toolkits (SDKs). APIs and SDKs facilitate the development and maintenance of software or firmware widgets, applications, and other code. An operating system contained in the memory devices 112 or 118 may include one that is open to third-party application development (i.e., has APIs available for independent software vendors to utilize when writing code, examples including Apple® iOS, Google® Android, Microsoft Windows® phone or Windows® Mobile, and Symbian operating systems), or one that is not open to third-party application development.

In various implementations, portions of the computer-executable code facilitate interactions between the user of the mobile device 104 and the diagnostics back-end system 102. The UI 122 may include a graphical user interface-based application, which may provide functionality to assist the user to perform tasks related to the diagnostics back-end 102, such as performing troubleshooting problems (e.g., technical device problems could be supported by a call center related to the manufacturer of the mobile device 104 or by the wireless service provider), receiving other customer support, and so on.

The client-side app 120 facilitates communicating with the diagnostics back-end 102 and providing functionality relating to the diagnostics back-end 102.

Exemplary Processes of the System

Some exemplary processes using the system described above will now be provided. These are only examples and many other examples are, of course, possible. Further, based on such examples, one of ordinary skill in the art will appreciate general features of the present system to allow a mobile device to more effectively interact with a call center/diagnostics back-end.

Figure 2:
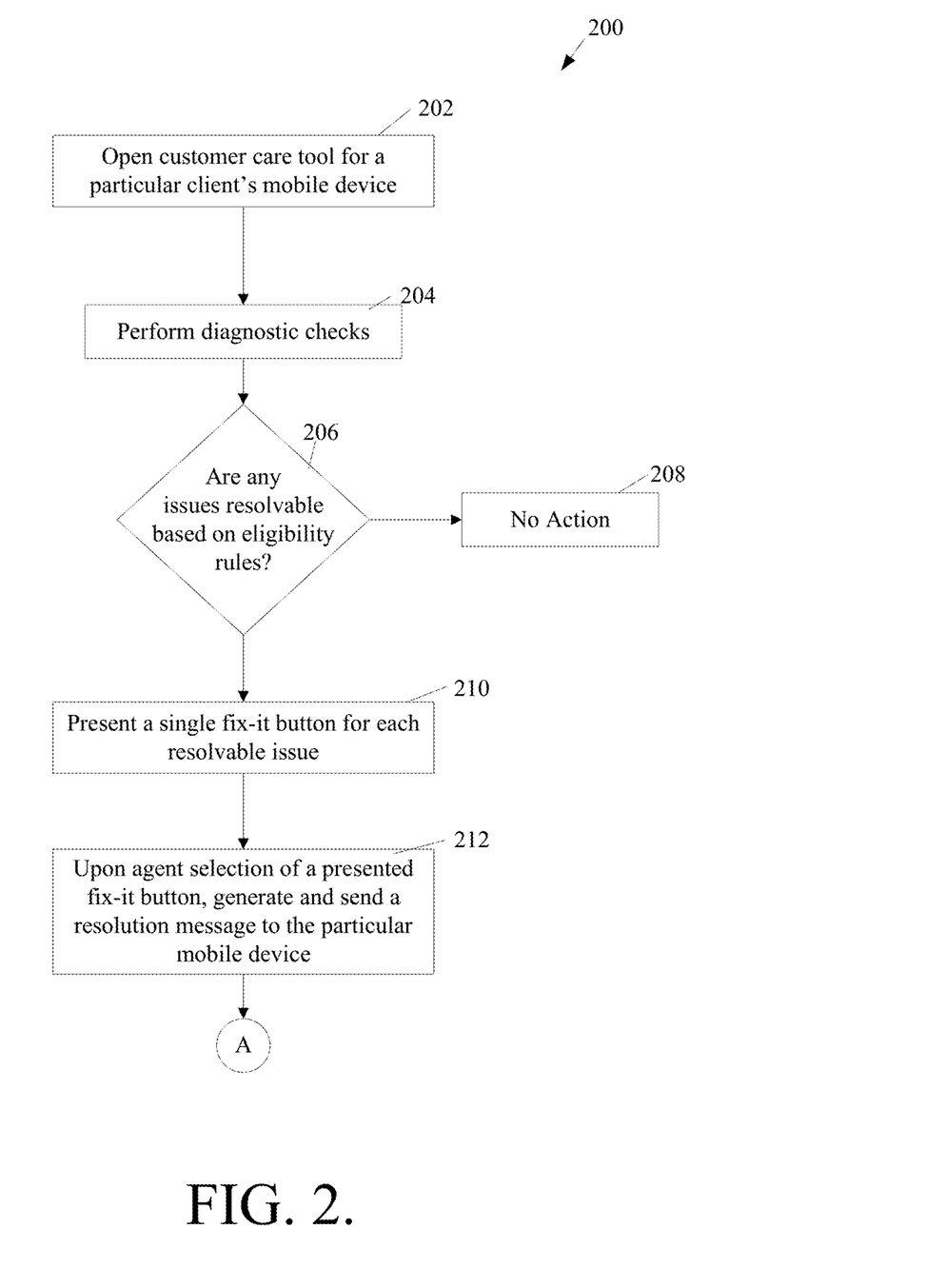
FIG. 2 shows a flow diagram of an exemplary process performed by a customer-care system for determining if a user's mobile device is eligible for one-click remote fixing.

FIG. 2 illustrates an exemplary process 200 performed by the agent terminal 108 at a call center, retail outlet or other support environment. First, at a block 202, the agent opens up a customer-care tool using the user-interface device 138 for providing service for a particular client's mobile device. The agent may open a customer care user interface-based tool in response to receiving a service request (e.g., call or message) associated with a particular one of the mobile devices 104. Next, at a block 204, diagnostic information associated with the particular mobile device 104 is analyzed to determine whether an issue exists and if there exist any solutions for resolving the issue or improving the issue in some way. The diagnostics analysis and solution determination may be performed by the diagnostics/solutions module 124 before or after opening of the customer care user interface-based tool. Diagnostic checking is described in more detail below with regard to FIG. 4.

Next, at a decision block 206, the processor 110 executes the eligibility module 134 in order to determine if any of the solutions, identified as a result of the diagnostics/solutions analysis, are resolvable, based on predefined eligibility rules and based on information associated with the particular mobile device 104.

The determination of eligibility analyzes many different factors when determining resolution eligibility. Some factors may include any of the following:

can the operating system executed by the processor 116 of the mobile device 104 perform the identified solution(s)?;
  does the user's usage plan and customer status allow performance of the identified solution(s)?;
  do other apps on the mobile device allow execution of the identified solution(s)?;
  is the location of the mobile device acceptable for the execution of the identified solution(s)?;
  is the current operating state and/or an estimated future operating state of the mobile device acceptable for the execution of the identified solution(s)?;
  are third-party applications or third-party communications necessary for execution of the identified solution(s), and, if necessary, are they installed?; and
  does the mobile device's security profile and client-side application's granted permissions allow for execution of the identified solutions?

If, at the decision block 206, the eligibility rules do not allow execution of any identified solutions or no solutions/issues were identified in the diagnostic analysis, then at a block 208 no action is performed. If, however, at the decision block 206 a solution is eligible for execution, based on the eligibility rules, then at a block 210 the processor 110 executing the presentation module 136 causes presentation of a single fix-it button for each issue that is identified as eligible for resolution. Next at a block 212, after the agent has selected the presented fix-it button, the processor 110 generates and sends a resolution message to the particular mobile device.

Figure 3:
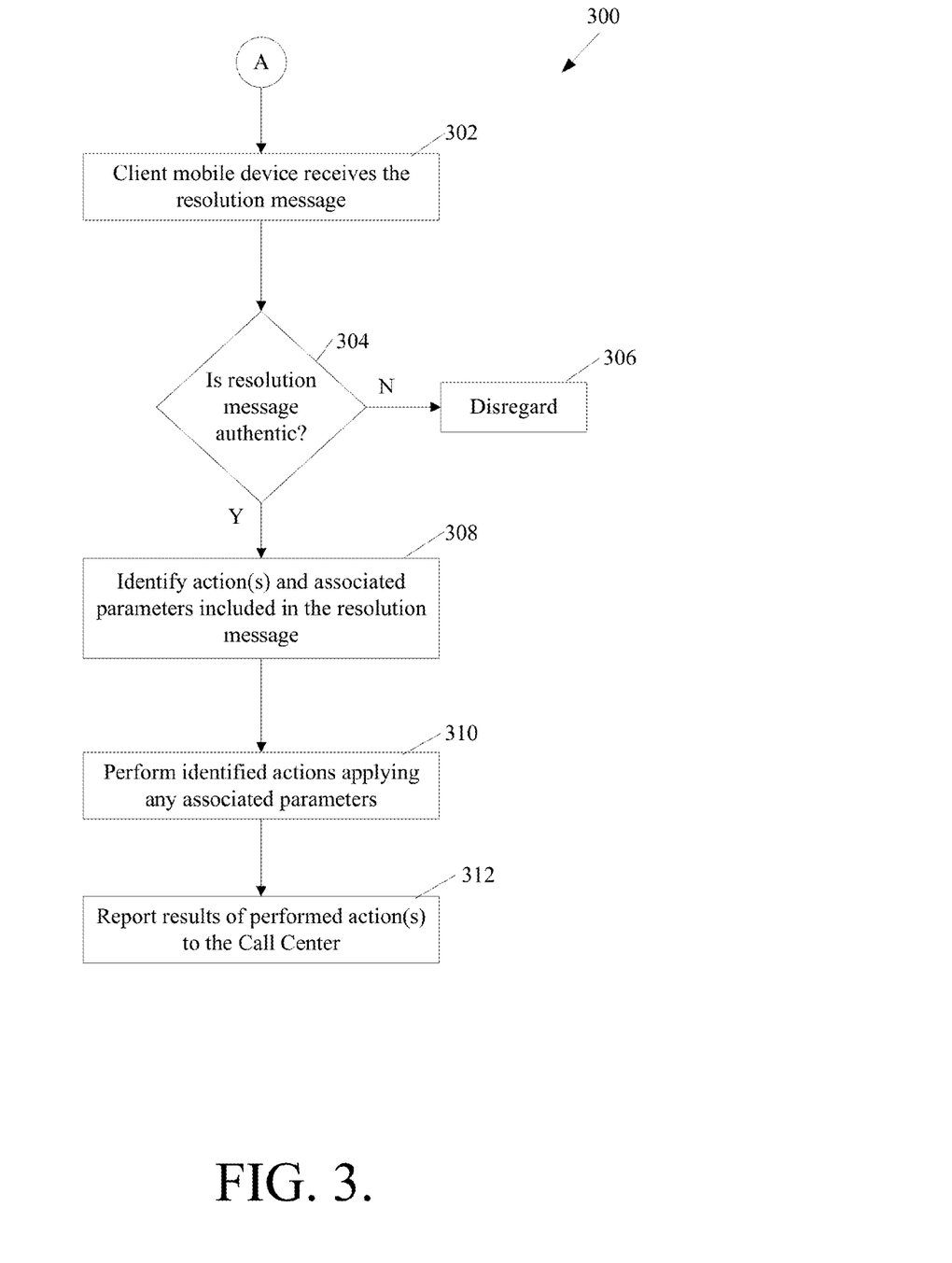
FIG. 3 shows a flow diagram of an exemplary process performed on a user's mobile device upon execution of a one-click fix performed at a customer-care center.

FIG. 3 illustrates an exemplary process 300 performed at the user's mobile device 104. First at a block 302, the particular user's mobile device 104 receives the resolution message from the diagnostics back-end 102. Next, at a decision block 304, the processor 116 determines if the received resolution message is authentic. Authentication may be performed by analysis of an authentication code included within the resolution message. Hashed message authentication code (HMAC) is one exemplary type of authorization code. Other authorization codes may be used.

If the received resolution message is determined not to be authentic, then at a block 306 the received resolution message is ignored/disregarded. However, if at the decision block 304, the resolution message was authenticated by the processor 116, then at a block 308, the processor 116 executing the client-side application 120 identifies any actions that are included within, or associated with, information stored in the received resolution message and parameters, if included in the resolution message. The memory 118 of the mobile device 104 may include a lookup table (LUT) or similar storage mechanism for storing sets of actions to perform, based on issue identifiers included in resolution messages.

At a block 310, the processor 116 performs the identified actions by applying any of the associated identified parameters. Then, at a block 312, the mobile device 104 reports the results of the actions to the diagnostics back-end 102 and, in particular, to the agent terminal 108 with the open customer-care tool associated with the mobile device 104.

Figure 4:
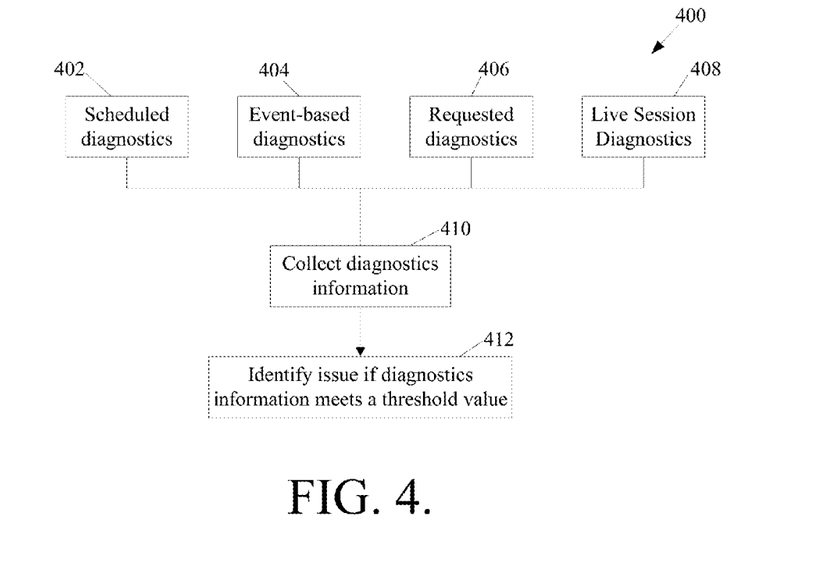
FIG. 4 shows a flow diagram of an exemplary process of performing diagnostics at a diagnostics back-end system.

FIG. 4 illustrates an exemplary diagnostics process 400 that may be performed at the block 204 of FIG. 2. First, various types of diagnostics may be performed. A first exemplary type of diagnostics includes scheduled diagnostics at block 402. The scheduled diagnostics are those that are performed at a predefined time, day, week, or month. The scheduled diagnostics may be assigned by an administrative entity or by an entity responsible for the operation of the diagnostics/solutions module 124. A second exemplary type of diagnostics includes event-based diagnostics at block 404. The event-based diagnostics are diagnostics performed after or during the occurrence of a designated event. An exemplary event might cause diagnostics to analyze coverage data in the event of the mobile device going off a telecommunications network supported by a preferred provider (e.g., roaming)

A third exemplary type of diagnostics includes requested diagnostics at block 406. The requested diagnostics may be those diagnostic checks specifically requested by an administrative entity, the entity responsible for operation of the diagnostics/solutions module 124 or by the user of the mobile device 104. A fourth exemplary type of diagnostics includes live-session diagnostics at block 408. The live-session diagnostics are performed during an active session between the mobile device 104 and the diagnostics back-end system 102.

At block 410, the diagnostics information generated at blocks 402-408 is collected. At block 412, an issue for possible resolution is identified if the associated diagnostic information meets associated predefined thresholds. Associated threshold values may be based on any of user requirements/desires, system requirements, or other optimization requirements. The predefined thresholds relate specifically to particular information that was diagnosed. For example, if the information diagnosed was a download data rate, then any download data rate below a threshold rate will trigger an issue for possible resolution.

Figure 5:
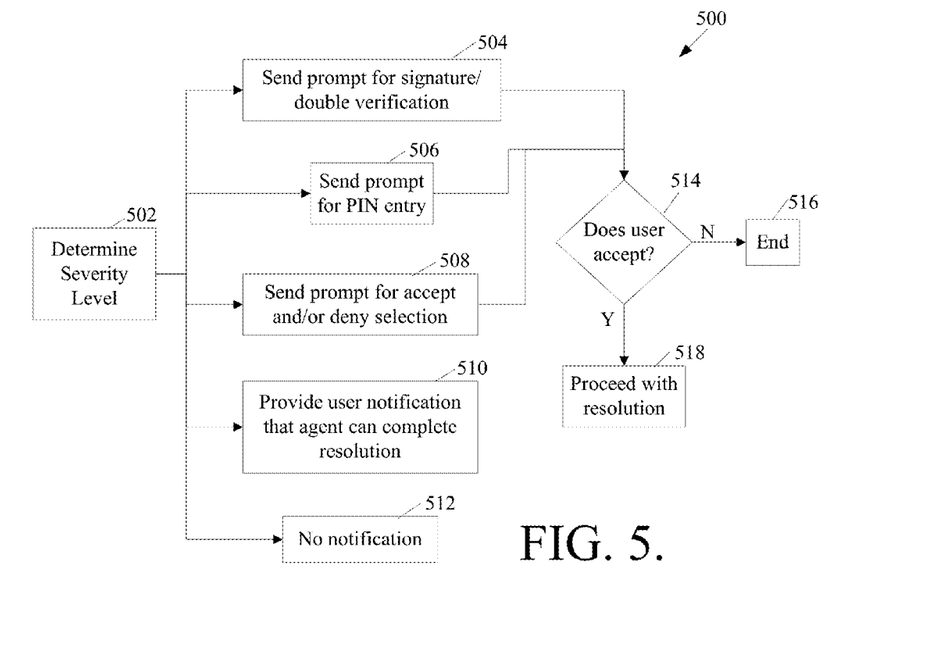
FIG. 5 shows a flow diagram of an exemplary process for determining the level of the user's interaction prior to execution of a remote fix.

FIG. 5 illustrates an exemplary process 500 of determining the severity of resolving identified issues and, based on the determined resolving severity, determining what user interaction is required. First, at a block 502, the processor 106 executing at least one of the diagnostics/solutions module 124 determines severity of consequences if predefined actions are taken to resolve an identified issue. If the severity determination is determined to be extremely destructive to data located on the client's mobile device, then, at a block 504, the processor 116 executing client-side application 120 is instructed to generate a prompt for the user's signature and/or a prompt for double verification by the user. These prompts are presented at the UI 122. If the severity determination is determined to be destructive, then, at a block 506, a prompt for a personal identification number (PIN) is presented on the user interface 122 of the particular device 104. The PIN prompt may be generated by the processor 116, based upon information included within the resolution message or in accordance with some other message received from the processor 106. Extremely destructive and/or destructive determinations relate to actions that may remove personal data/files from the mobile device or affect the mobile device's operation, resulting in reduced user experience/satisfaction.

If the severity determination equates to some user impact, then, at a block 508 an accept/deny prompt is presented at the UI 122 of the particular mobile device 104. If the severity determination equates to low-impact, then, at a block 510, the particular mobile device is notified that the agent can perform resolution actions associated with the diagnosed issue.

Below is an exemplary list of resolvable issues:

| | |
|---|---|
| Accessibility Feature: Talkback | On/Off |
| Mobile Data | On/Off |
| Check for ROM Software Update | Newer yes/no |
| Initiate a ROM Software Update | Newer yes/no |
| Check for individual application update (e.g., from Google ® Play or iOS App Store) | Newer yes/no |
| Initiate an individual application update (from appropriate app market) | Newer yes/no |
| APN Settings | Reset to appropriate value |
| Apps: Install an Application | App to be installed |
| Apps: Uninstall an Application (with user consent) | App to be removed |
| Apps: Uninstall an Application (silent to user) | App to be removed |
| Apps: Clear App's Cache(s) | App to be cleaned |
| Apps: Clear App's Data | App to be reset |
| Blocked Address Book #s/Contacts (phone book entries set to be declined/sent straight to VM) | #s blocked on device |
| Blocking Mode/Sleep Mode | Is power/night mode set? |

Block texts from specific Address Book #s/Contacts
Spam text list (similar to above but separate spam list)
Back up DCIM to SD
Back up contacts to SD
Wipe cache
Wipe Internet history
Wipe SMS history
Power cycle
App defaults (launcher)
Bluetooth
Accessibility: iOS features
Accessibility: Android features
Airplane Mode
Rotation Lock
Power Saver Mode
USB Storage/MTP Mode
Call Forwarding
Developer Settings
Call log history
Set camera to save to SD card
Roaming Data
Radio Mode (2G/4G/LTE)
Account Sync
SMS/MMSC Settings
Display: Timeout
Display: Brightness/Auto
WiFi
Sound Profile (vibrate)

Ring Volume
Car Mode
Background Data
Locale: Language
Input Keyboard
Tethering On/Off
WiFi Calling
TTY/Hearing Aid Settings
Apps: Force close
Data usage warnings
Caller ID presentation show/no show
SMSC settings
SIM card unlock
GPS
NFC
Ringtone
Wallpaper
Time & Date & Time Zone
Multitasking Mode
Locale: #/date Formatting
Security: Unknown Sources
Location Access settings
Voicemail Provider
Security Settings The following are tasks that an agent may perform at the agent terminal 108 at his discretion without the user's authorization for making changes at or associated with the mobile device 104:

Clear caches
Clear a particular app's cache
Reboot the device
Reset device or app defaults
Run diagnostics
Run coverage report
Backup content
Set sound profiles or ringtones
Start mobile device system firmware upgrade (Over The Air software upgrade).

Figure 6:
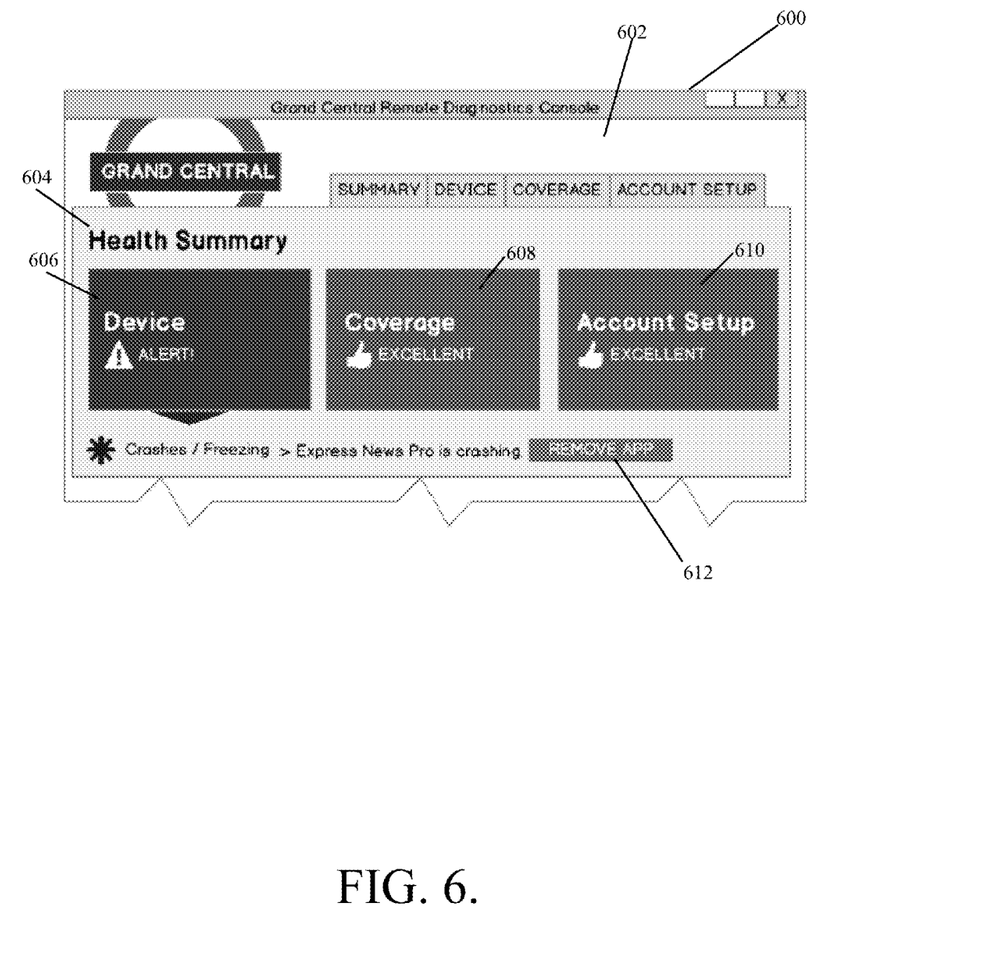
FIG. 6 is a screen shot of an exemplary graphical user interface presented to a customer-care representative.

FIG. 6 illustrates a partial screenshot 600 of an exemplary customer-care tool 602 presented at the UI 138 of the agent system 108. The customer care tool 602 includes a diagnostic health summary page 604. The diagnostic health summary page 604 presents results associated with different diagnostic checks. A first area 606 indicates whether any diagnostic issues exist for a particular user's mobile device. A second area 608 indicates whether any diagnostic coverage issues exist for the particular user's mobile device. A third area 610 indicates whether any account-settings diagnostic issues exist for the user of the particular user's mobile device. In the example shown, only a diagnostic device issue exists, as shown by an alert icon and "alert!" message presented within the first area 606.

Single-issue resolution buttons, menu items, or links are presented below the areas 606-610. The presentation of the single-issue resolution button, menu item or link means that all eligibility factors have been cleared for execution of actions previously defined for resolving the identified issue. In this example, a single resolution button 612 is presented upon successful completion of an eligibility check performed by the processor 110 when executing the eligibility module 134. The single resolution button 612 relates to resolution action(s) associated with the device's identified issue shown in the first area 606. The resolution of the device's identified issue was determined by the processor 110 when executing the diagnostics/solutions module 124. In this example, the device's identified issue is that the application Express New Pro™ that is installed on the particular user's device is crashing during operation.

Figure 7:
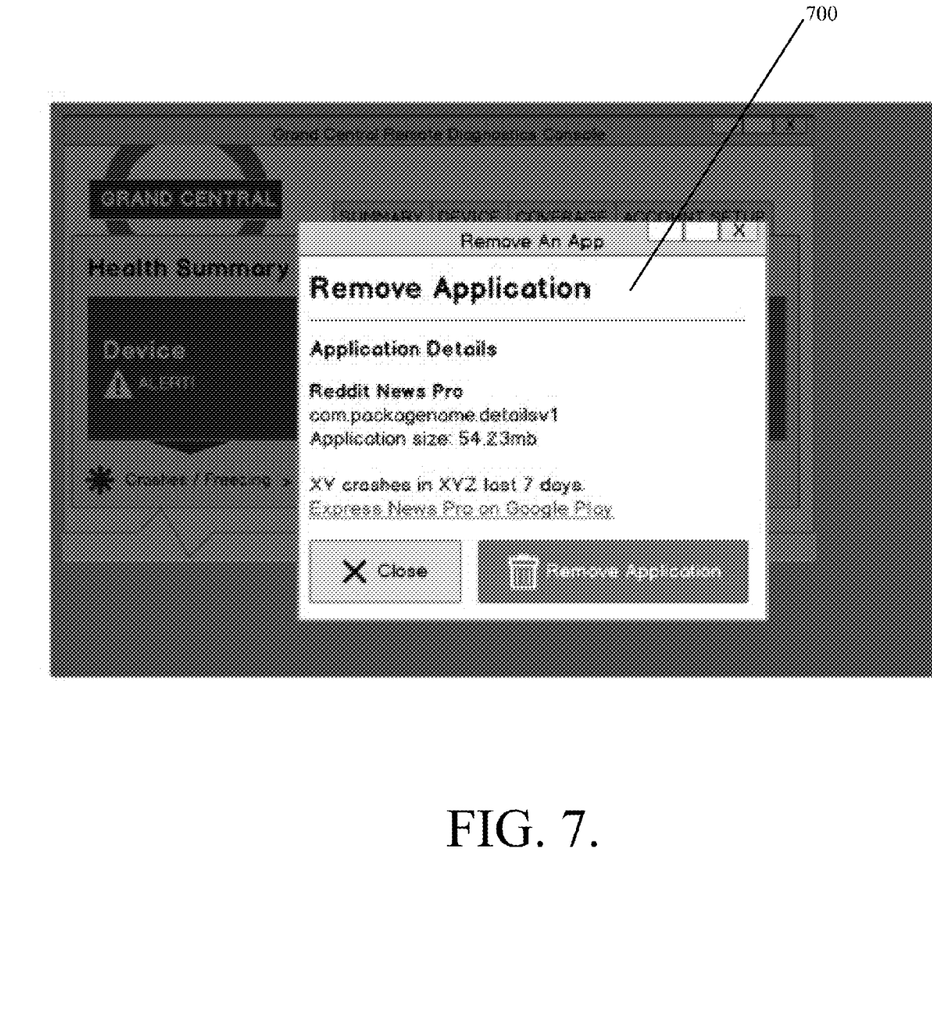
FIG. 7 is a screenshot of an exemplary graphical user interface presented to a customer-care representative for confirming an action associated with a single solution button as shown in FIG. 6.

FIG. 7 shows a resolution confirmation window 700 that may be displayed to the agent after the agent has activated a resolution button, such as the resolution button 612. In this example, the resolution confirmation window 700 indicates that the action, of removing the application identified as causing problems, will be performed. The resolution confirmation window 700 identifies the action or actions to be performed, the affected application or data, and any associated diagnostics information.

Figure 8:
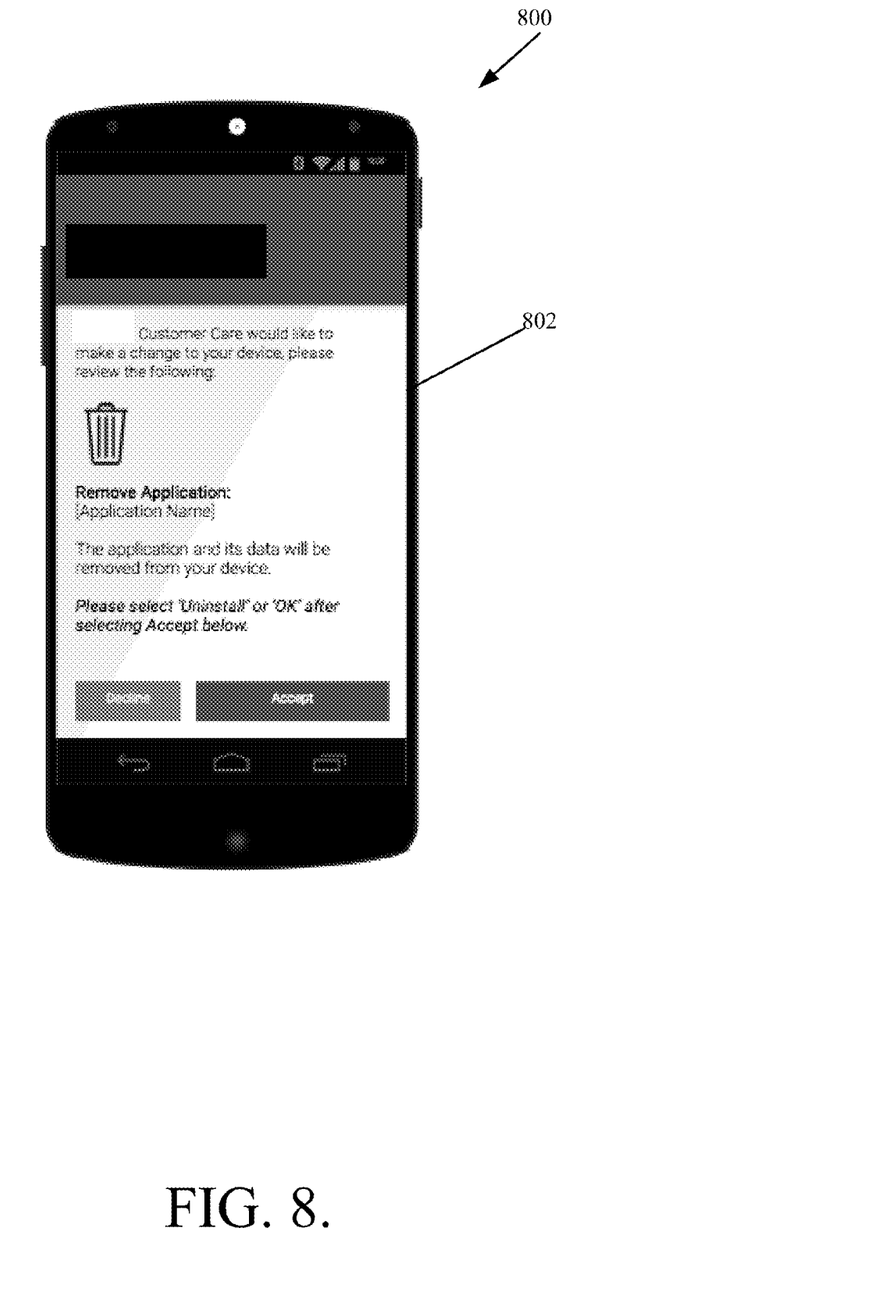
FIG. 8 shows a user's mobile device presenting an exemplary screenshot for allowing a user of the mobile device to accept an action initiated by a customer-care representative.

FIG. 8 illustrates a user's mobile device 800 that is presenting a remote support interface page 802. The remote support interface page 802 presents information regarding what actions are to be performed on the mobile device 800 or on account information associated with the user of the mobile device, detailed information regarding associated diagnostics information, a possible hyperlink to additional information associated with the diagnostics information or the associated identified actions, and/or the destructive level associated with the identified actions. Located at the bottom of the remote support interface page 802 are "decline" and "accept" buttons. User activation of the accept button will initiate the identified actions. Activation of the decline button by the user will not perform the identified action(s).

Figure 91:
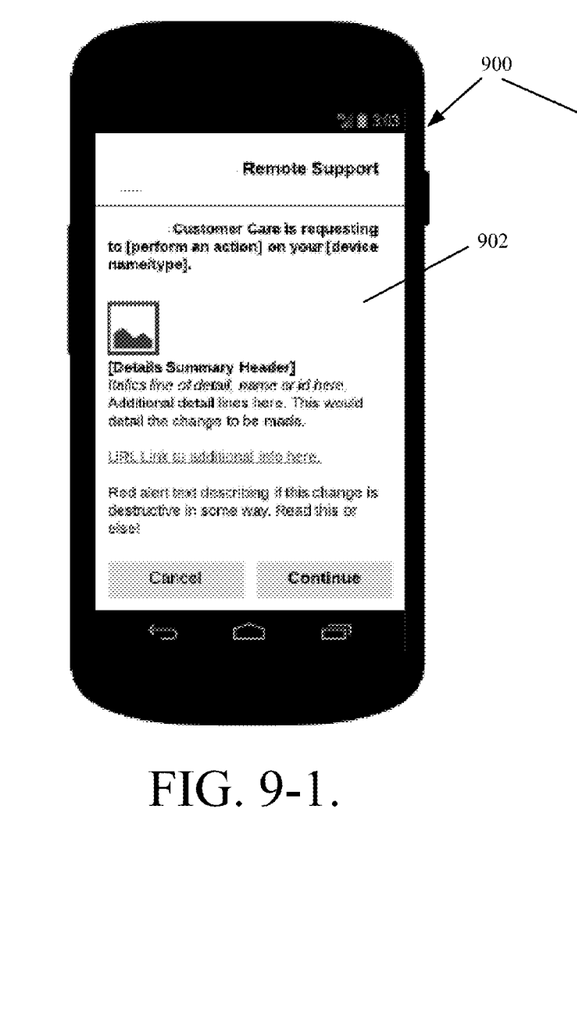
Figure 92:
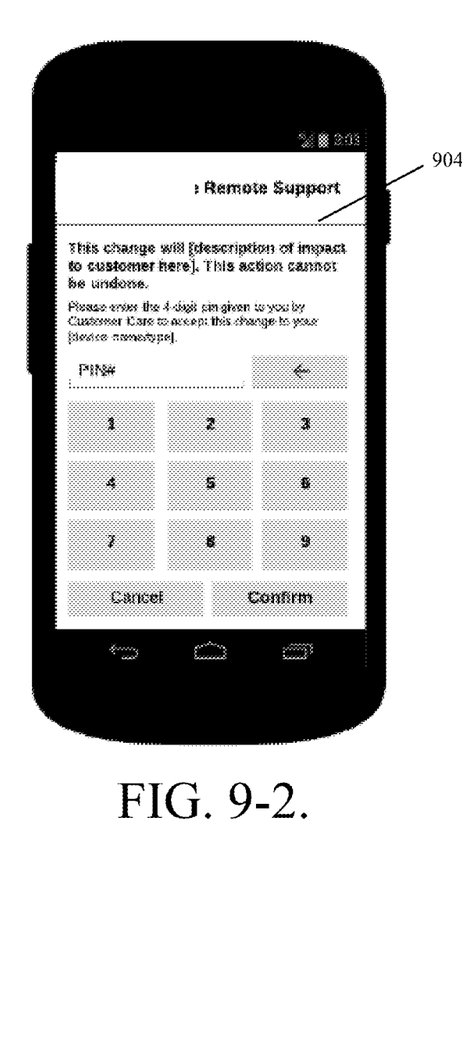
Figure 93:
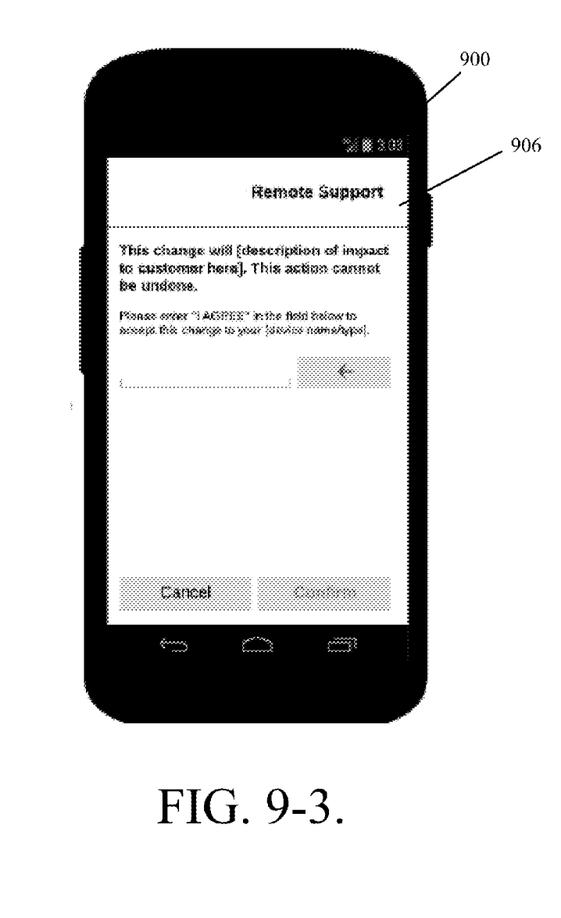

FIG. 9 illustrates a user's mobile device 900 that is presenting a remote support interface page 902. The remote support interface page 902 is similar to the remote interface page 802, except that the remote support interface page 902 does not include decline or accept buttons but includes only buttons for canceling the remote support session or continuing the remote support session. User activation of the "continue" button will cause the presentation of a PIN entry page 904, as shown in FIG. 9-2, or a positive agreement page 906, as shown in FIG. 9-3, depending upon the severity level associated with the presented action(s). The PIN entry page 904 describes the action(s) to be performed upon the user's entering a previously defined PIN. The positive agreement page 906 requires the user to enter a predefined statement, for example, "I agree" into a positive acceptance field before the identified action(s) can be performed.

Figure 10:
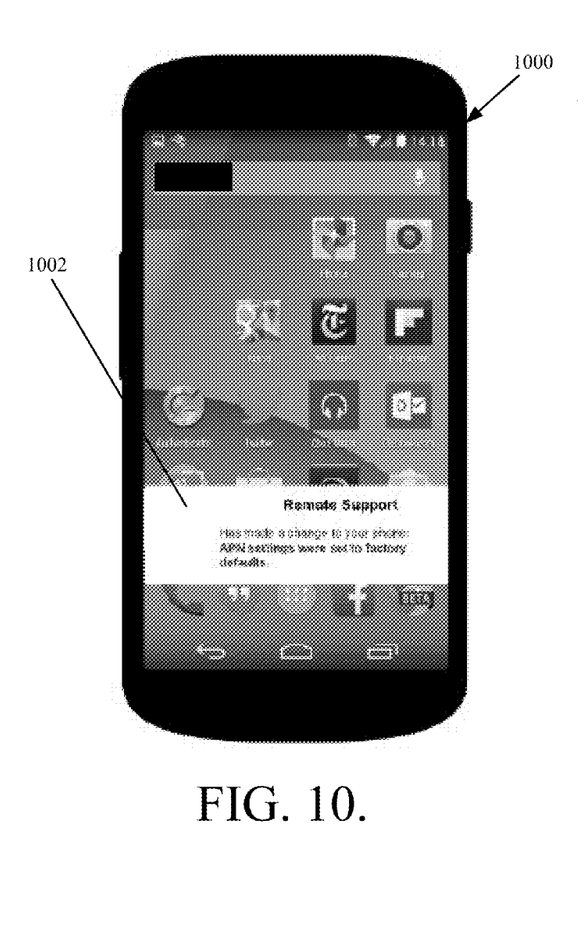
FIG. 10 shows a user's mobile device presenting an exemplary screenshot for informing a user that a customer-care representative has performed a fix on his mobile device.

FIG. 10 illustrates a user's mobile device 1000 that is presenting a remote-support change confirmation pop-up 1002. The remote-support change confirmation pop-up 1002 indicates what changes were made to the mobile device 1000 after execution of actions associated with an action ID and parameters included in a resolution message received at the mobile device 1000.

The following is an example of an agent's initiating a single application uninstall for that customer's mobile device. An application program interface (API) may be exposed HTTP or other IP methods. The API may accept the mobile device's international mobile equipment identity (IMEI)+mobile station integrated services digital network (MSISDN) as a primary input parameter. TODO: align with call-center service. The API may accept rep identity tokens such as Windows NT User ID as an input parameter for logging purposes. The API may return proper hypertext transfer protocol (HTTP) error codes for relevant successes/failures:

200 OK;
400 Bad Request (Malformed or improper request);
401 Unauthorized (Authorized errors);
403 Forbidden (Policy errors);
404 Not Found (For example, MSISDN/IMEI not found); and
500 Internal Server Error.

If the diagnostics back-end service is unavailable for any reason, an error code may be generated and the response returned immediately, as above. All network communications may be encrypted. All commands may be authenticated against diagnostics back-end system so that only requests from the network infrastructure are passed to the mobile device. Only authorized network-provider clients may be allowed to access the service and perform fixes from single button activation.

The network provider may recommend client-secure socket layer (SSL) certificates to be used to meet this specification. Access to the system may be logged. Logs may include:

Date/Time of the request (UTC);
IMEI/MSISDN of the device being updated;
NT User ID making the request;
Action taken for the device; and
Result of that action (successful, customer declined, error).

Audit logs may be retained according to the overall system auditing and logging policies. Each API may be implemented behind a static IP address or fully qualified domain name.

The following relates to a single button for resolving incorrect access point name (APN) settings based on the diagnostics check determining a need to update APN settings of the mobile device to values selected at the agent system 108. The processor 110 executing the diagnostics/solutions module 124 recommends the best APN settings for the particular type of mobile device. When applying the recommendation, the mobile device will do whatever it needs to do to update the APN settings/data (e.g., cycle data session or reboot automatically). Execution of this recommendation does not send a user a confirmation prompt. The processor 110 determines that a precondition, that must occur before fixing the APN settings, is that the mobile device has a currently active APN profile. Communication of a resolution message may need to utilize SMS if data communication is not working due to an improperly configured APN. The client-side app may check connectivity to back-end services before trying SMS. The client-side app may be shipped or loaded into the mobile device with embedded APN profiles so that an SMS may reference the embedded APN profile, so that all the profile data do not have to be sent via SMS. The actions for fixing the incorrect APN settings need to replicate actions that an OS does when 'Reset to Default' is selected for the APN settings.

Jumplists

A jumplist presented at the agent terminal 108 allows the agent to quickly navigate on behalf of the customer through different areas of the customer's mobile device. No pre-connectivity or prompt is required of the end-user. Activities are called by a client-service application, which receives commands from the agent and navigates to the respective area of the device immediately.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A computer-implemented method comprising:
at a diagnostics back-end system associated with a telecommunications provider, supporting at least one of a customer care agent terminal device having a processor or a retail agent terminal device having a processor, the processor executing computer-readable instructions to:
perform one or more diagnostic analyses of information and settings associated with a mobile device;
identify a plurality of resolvable issues based on the one or more diagnostic analyses;
for each identified resolvable issue, determine execution eligibility of each of one or more solution actions associated with the resolvable issues; and
upon determination that execution eligibility for one of the one or more solution actions is positive, cause display of a single graphical user interface button at a user interface device of an agent terminal, wherein activation of the single graphical user interface button causes execution of associated solution actions on the mobile device.

2. The method of claim 1, wherein the performing the one or more diagnostic analyses comprises:
performing at least one of:
one or more scheduled diagnostics;
one or more event-based diagnostics;
one or more requested diagnostics; or
one or more diagnostics during a diagnostics back-end session with a subscriber to the telecommunications provider.

3. The method of claim 1, wherein the performing the one or more diagnostic analyses comprises:
analyzing information associated with the mobile device;
analyzing information associated with telecommunications coverage related to operation of the mobile device; and
analyzing information associated with an account of a subscriber to the telecommunications provider who is associated with the mobile device.

4. The method of claim 1, wherein the processor further execute computer-readable instructions to:
generate a resolution message in response to activation of the resolution button; and
send the generated resolution message to the mobile device.

5. The method of claim 4, wherein the resolution message comprises:
an authentication code section; and
an action identifier section.

6. The method of claim 5, wherein the resolution message further comprises a parameter values section.

7. The method of claim 1, wherein the determining execution eligibility is based on at least one of current or expected operational abilities of the mobile device, a service plan associated with the mobile device, current or expected location information of the mobile device, or an expected effect on one or more applications currently residing on the mobile device.

8. A system comprising:
a diagnostics back-end system associated with a telecommunications provider, the diagnostics back-end system comprising:
a processor; and
a memory device configured to store one or more instruction modules executable by the processor to:
perform one or more diagnostic analyses of information and settings associated with a mobile device;
identify a plurality of resolvable issues based on the one or more diagnostic analyses;

for each identified resolvable issue, determine execution eligibility of each of one or more solution actions associated with the resolvable issues;

upon determination that execution eligibility for one of the one or more solution actions is positive, cause display of a single graphical user interface button at a user interface device of a customer-care agent device; and causing a remote support interface page to display at least a decline button and an accept button on the mobile device;

wherein activation of the accept button on the mobile device causes execution of associated solution actions on the mobile device.

9. The system of claim 8, wherein the processor performs the one or more diagnostic analyses by:

performing at least one of:
- one or more scheduled diagnostics;
- one or more event-based diagnostics;
- one or more requested diagnostics; or
- one or more diagnostics during a diagnostics back-end session with a subscriber to the telecommunications provider.

10. The system of claim 8, wherein the processor performs the one or more diagnostic analyses by:

analyzing information associated with the mobile device;

analyzing information associated with telecommunications coverage related to operation of the mobile device; and analyzing information associated with an account of the subscriber of the mobile device.

11. The system of claim 8, wherein the processor further executes computer-readable instructions to:

generate a resolution message in response to activation of the resolution button; and send the generated resolution message to the mobile device.

12. The system of claim 11, wherein the resolution message comprises:
- an authentication code section; and
- an action identifier section.

13. The system of claim 12, wherein the resolution message further comprises a parameter values section.

14. The system of claim 8, wherein the processor determines eligibility based on at least one of current or expected operational abilities of the mobile device, a service plan associated with the mobile device, current or expected location information of the mobile device, or an expected effect on one or more applications currently residing on the mobile device.

* * * * *